June 16, 1964
C. L. DERUS
3,137,471
MEAT HOOK HOLDERS
Filed May 2, 1962
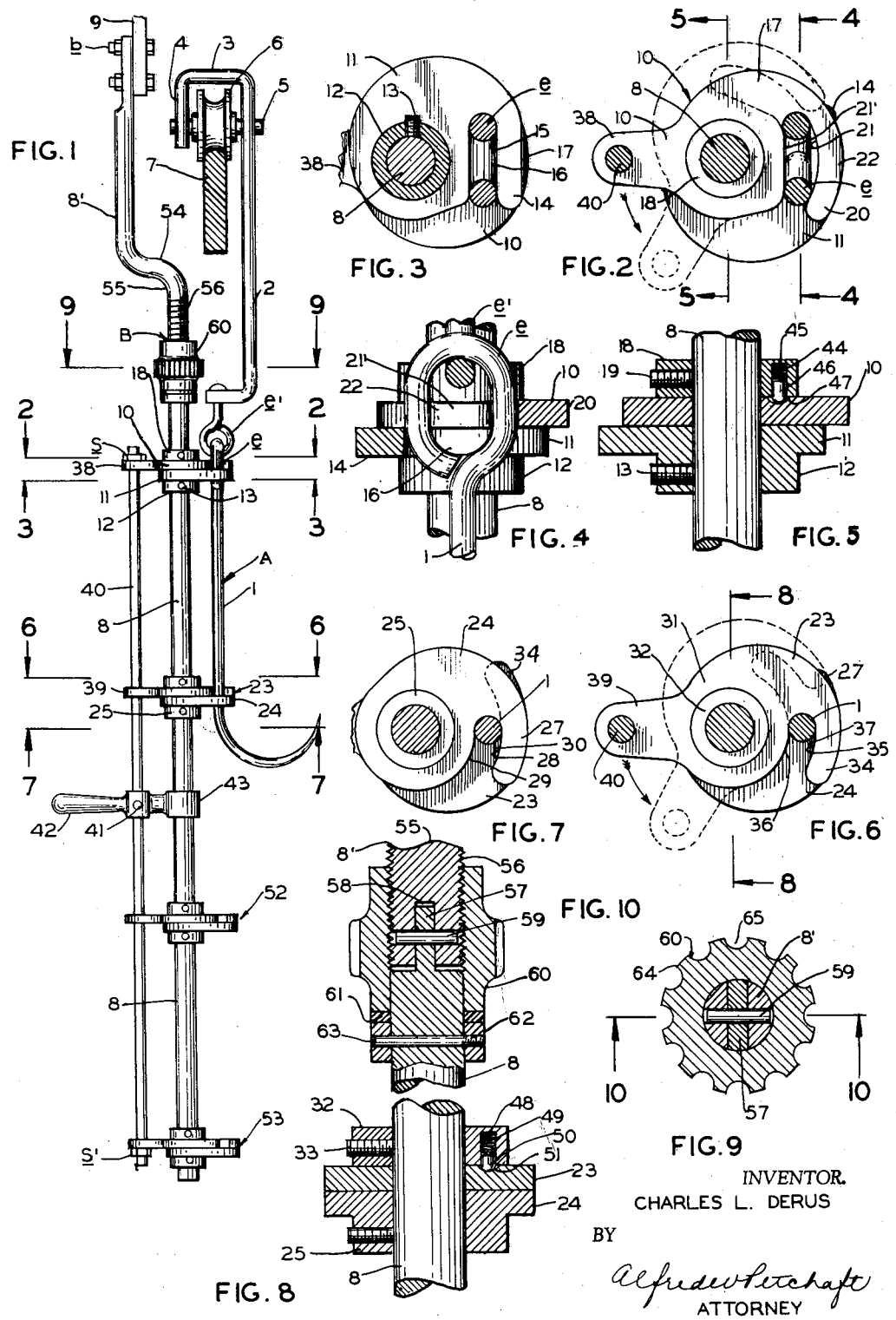
INVENTOR.
CHARLES L. DERUS
BY
Alfred W Petchaft
ATTORNEY

# United States Patent Office 3,137,471
Patented June 16, 1964

3,137,471
MEAT HOOK HOLDERS
Charles L. Derus, 3170 Leola Ave., St. Louis 39, Mo.
Filed May 2, 1962, Ser. No. 191,812
14 Claims. (Cl. 248—339)

This invention relates in general to certain new and useful improvements in meat hook holders and, more particularly, to a device for clamping traveling meat hooks in a rigid position during a meat hanging operation.

Today, it is a common practice to use meat hooks of the so-called "traveling type" on storage docks and other areas for loading and unloading meat from refrigerated railroad cars, trucks, and the like. In practice, a plurality of these traveling meat hooks are movably mounted on a supporting rail which is located somewhere near the edge of the dock. Thus, when a refrigerated railroad car or truck is parked along the side of the dock, each of the meat hooks is moved along the rail to the door of such car or truck and a suitable slab of meat hung thereon. The hook containing the meat is then moved along the rail to a suitable refrigerated storage container and the next succeeding hook is brought up to the door of the truck or car and a suitable slab of meat hung threon. Obviously, this operation is reversed if it is intended to load the car or truck.

However, in order to prevent each of the refrigerated meats from being exposed to an unrefrigerated atmosphere for any length of time, this operation is carried out at a rapid pace. This is especially true in warm and dry weather. The slabs of meat that are hung on such hooks are usually rather large and weigh a considerable amount. The hooks are freely swingable on some type of supporting mechanism which is, in turn, secured to a roller journaled on the rail. As the hook is freely swingable, it is often difficult for one man to attach the slab of meat to the traveling meat hook. According to usual practice, one man is required to hold the hook while another man attaches the slab of meat to the hook. It is considered inefficient and even somewhat dangerous for one man to perform this operation alone. In fact, with heavy sides of beef, it is virtually impossible for one man to hook the meat by himself.

It is, therefore, the primary object of the present invention to provide a meat hook holder which is capable of maintaining a meat hook in a rigid position during a meat loading operation.

It is another object of the present invention to provide a meat hook holder of the type stated which is adapted for use with a series of meat hooks movably mounted on a support rail and which is capable of holding each succeeding meat hook in a rigid position during the loading operation.

It is a further object of the present invention to provide a meat hook holder of the type stated in which the latching means is relatively simple, durable, and reliably constructed.

It is an additional object of the present invention to provide a meat hook holder of the type stated which can be easily and conveniently operated, thereby reducing the necessary time to load and unload meat from refrigerated cars, trucks, and the like.

It is also an object of the present invention to provide a meat hook holder of the type stated which is relatively economical to manufacture.

With the above and other objects in view, my invention resides in the novel features of form, construction, arrangement, and combination of parts presently described and pointed out in the claims.

In the accompanying drawing (one sheet)—

FIG. 1 is a side elevational view of a meat hook holder constructed in accordance with and embodying the present invention and showing a meat hook in secured position;

FIGS. 2 and 3 are sectional views taken along lines 2—2 and 3—3, respectively, of FIG. 1;

FIGS. 4 and 5 are vertical sectional views taken along lines 4—4 and 5—5, respectively, of FIG. 2;

FIGS. 6 and 7 are sectional views taken along lines 6—6 and 7—7, respectively, of FIG. 1;

FIG. 8 is a fragmentary sectional view taken along line 8—8 of FIG. 6;

FIG. 9 is a sectional view taken along line 9—9 of FIG. 1; and

FIG. 10 is a fragmentary sectional view taken along line 10—10 of FIG. 9.

Referring now in more detail and by reference characters to the drawing, which illustrates a preferred embodiment of the present invention, A designates a conventional meat hook and movable mounting means therefor as shown in FIG. 1, and which comprises a straight shank 1 having an enlarged eyelet e at its upper end, the eyelet e being secured to a depending eyelet e' which is, in turn, pivotally secured to the lower end of a movable shaft 2 so that the shank 1 will be swingably mounted on the movable shaft 2. Integrally formed with the upper end of the shaft 2 is a transversely extending support arm 3 which integrally merges into a depending flange 4. Extending between and journaled in the flange 4 and shaft 2 is a pin 5 upon which is rotatably mounted a roller 6. The roller 6 is supported by, and rolls along, a support rail 7 which is, in turn, suitably mounted on any supporting structure (not shown). The meat hook and the movable means therefor are conventional and, therefore, the detailed structure and operation is neither illustrated nor described in detail herein. The meat hook A is described herein only to illustrate the manner of operation of the present invention and it should be understood that the present invention is suitable for use with any type of movable meat hook. As a mater of fact, it is common practice in the meat industry to employ hooks of several different lengths which are respectively adapted for full sides, quarters, and pieces of meat of various sizes. Since such meat hooks differ from the meat hook A only in the length of the shank 1, such other forms of meat hooks are not illustrated nor described herein.

Adapted for use with the meat hook A is a holder B which comprises a vertical clamp supporting rod 8 which is secured to the lower end of an upper support rod 8' in a manner to be more fully described. The upper end of the support rod 8' is secured to any convenient supporting structure 9 by means of conventional bolts b. Secured to the clamp supporting rod 8 in approximate horizontal alignment with the hook eyelet e is an upper clamp 10 which comprises a lower clamping arm 11 having an integrally formed depending boss 12 which is concentrically mounted upon the rod 8 and is rigidly secured thereto by means of a set screw 13. The lower clamping arm 11 is integrally formed with an outwardly extending relatively straight hook-engaging finger 14 having an inwardly presented flat vertical wall 15 which is spaced from the body of the arm 11 defining a recess 16 which is sized for retentively engaging the eyelet e. The upper clamp 10 also includes an upper clamping arm 17 which is pivotally mounted on the clamp support rod 8 and retained thereon by means of a set collar 18 and a set screw 19. The upper clamping arm 17 is integrally formed with an outwardly extending arcuately shaped hook-engaging finger 20 having an inwardly presented arcuately shaped vertical wall 21 which is spaced from a straight flat vertical wall 21' formed on the body of the upper clamping arm 17 thereby defining a recess 22. The arcuate wall 21 has a normal radius with its center point coincident with the axial center line of the supporting rod 8. By reference to FIG. 2, it can be seen that the hook-engaging fingers 14 and 20, when in the open position, that is the position shown in dotted lines of FIG. 2, are opposed to each other. When the clamp 10 is pivoted to the closed position, that is the position as shown in the solid lines of FIG. 2, it can be seen that each of the hook-engaging fingers 14 and 20 will lie in marginal registration and, therefore, the recesses 16 and 22 will also be marginally aligned for snugly retaining the hook eyelet *e*. Thus, it can be seen that when the clamp 10 is closed, the shank 1 is prevented from rotating about its longitudinal axis.

Suitably mounted on the vertical clamp supporting rod 8 is a second clamp 23 which is downwardly spaced from the clamp 10 and substantially similar thereto. The clamp 23 includes a lower clamping arm 24 having an integrally formed depending boss 25 and is rigidly secured to the rod 8 by means of a set screw 26. The lower clamping arm 24 is integrally formed with an outwardly extending arcuately-shaped hook-engaging finger 27 having an inwardly presented arcuately-shaped vertical wall 28 which is spaced from a matching arcuately-shaped wall 29 on the body of the arm 24 forming a hook-retaining recess 30 for snugly accommodating the leg of the shank 1. The clamp 23 includes an upper hook arm 31 which is swingably mounted on the rod 8 and is retained thereon by means of a set collar 32 having a set screw 33. The hook arm 31 is integrally formed with an arcuately-shaped outwardly extending hook-engaging finger 34 which is spaced from the finger 27 and has an arcuately-shaped inwardly presented vertical wall 35 which is spaced from a similar arcuate wall 36 formed on the body of the arm 31 and thereby defines a hook-retaining recess 37. Each of the arcuate vertical walls 28, 29, 35, 36, is defined by arcs having a normal radius with the center point coincident with the axial center line of the supporting rod 8. It can be seen that when the clamp 23 is in the "open" position, that is the position as shown in the dotted lines of FIG. 6, the hook-engaging fingers 27, 34, are opposed to each other, and when the clamp 23 is in the "closed" position, that is, the position shown in the solid lines of FIG. 6, the hook-engaging fingers 27, 34, lie in marginal registration with each other and the recesses 30, 37, are marginally aligned for snugly retaining the leg of the shank 1. Thus, it can be seen that when the shank 1 is clamped within the clamp 10, it is prevented from rotating about its central axis, and, when clamped in the clamp 23, its movement is retarded in any horizontal direction.

Each of the upper arms 17, 31, of the clamps 10, 23, respectively, are provided with rearwardly extending flanges 38, 39, respectively, which are secured to a vertically extending actuating rod 40, the latter being rearwardly spaced from, and parallel to, the supporting rod 8. Rigidly secured to the actuating rod 40, by means of a set screw 41, is a handle 42 having an enlarged cylindrical head 43 which is pivotally mounted on the supporting rod 8. By means of this construction, it can be seen that as the handle 42 is swung in a counterclockwise direction about the supporting rod 8, it will carry with it the actuating rod 40 and pivot the upper arms 17, 31, about the supporting rod 8, thus opening each of the clamps 10, 23. If the handle 42 is then swung in a clockwise direction, it will carry with it the actuating rod 40 and pivot the upper arms 17, 31, to a "closed" position.

The set collar 18 is drilled from its underside to provide a small tubular recess or socket 44 for receiving a small compression spring 45 which abuts at its lower end against a hemispherical detent element 46 which may be optionally seated within a companion-shaped recess 47 formed within the upper face of the upper arm 17. Similarly, the set collar 32 is drilled from its underside to provide a small tubular recess or socket 48 for receiving a small compression spring 49 which abuts at its lower end against a hemispherical detent element 50 which may be optionally seated within a companion-shaped recess 51 formed within the upper surface of the upper arm 31. Thus, when each of the clamps 10, 23, are swung to their "closed" position, they may be retained in such position against unauthorized opening of the detent elements 46, 50, which are seated within the recesses 47, 51, respectively.

Mounted on the supporting rod 8 in downwardly spaced relation to the clamp 23 is a clamp 52 and mounted on the supporting rod 8 in downwardly spaced relation from the clamp 52 is a clamp 53, both of which are substantially identical to the previously described clamp 23. The clamps 52, 53, are provided for receiving meat hooks which have extra long shanks. However, in normal use, the clamps 52, 53, are not used. In this connection, it should also be noted that the supporting rod 8 can be provided with additional clamps which are spaced at intervals either larger or smaller than the distance between the clamps 52, and 53 whenever needed. It should also be understood that the clamp 52 and clamp 53 and any additional clamps which may be mounted on the supporting rod 8 are operatively connected to actuating rod 40 and opened and closed thereby in the same manner as the clamps 10 and 23.

By reference to FIG. 1, it can be seen that the actuating rod 40 is maintained in its parallel relationship by a pair of spaced set collars *s*, *s'*, the former of which is mounted on the rod 40 and abuts the upwardly presented surface of the flange 38, and the latter of which abuts the under-surface of a similar flange formed on the clamp 53. It should also be noted that each of the set screws 13, 26, can be loosened on each of the bosses 12, 25, respectively, and the set screws 19, 33, can be loosened on each of the set collars 18, 32, for adjusting the vertical position of each of the clamps 10, 23, on the supporting rod 8 in order to accommodate hooks of various sizes.

If desired, the clamp supporting rod 8 can be swingably mounted on the lower end of the upper support rod 8'. The lower end of the upper support rod 8' is integrally formed with an S-shaped curve 54 having a depending leg 55, the latter having an externally threaded portion 56. The upper end of the clamp supporting rod 8 integrally merges into a relatively flat tongue 57 which is movable within an elongated slot 58 formed in the lower end of the upper support rod 8' and is retained therein by means of a pin 59. The upper support rod 8' and the clamp supporting rod 8 are retained in rigid coaxial alignment by means of a locking sleeve 60 which is threadedly mounted on the threaded portion 56 and is disposed over the opposite end of the slot 58 and retaining the tongue 57 therein when in the locking position, that is the position as shown in FIGS. 1 and 10. When in the locking position, the lower end of the sleeve 60 abuts the upwardly presented surface of a nylon washer 61 which is concentrically disposed about the rod 8 and is supported by means of an annular abutment collar 62 which is secured to the rod 8 by means of a set screw 63. The locking sleeve 60 is preferably provided with an integrally formed diametrally enlarged ring 64 which is formed with a series of circumferentially spaced finger engaging grooves 65 which may be grasped for turning the locking sleeve 60. Thus, if it is desired to swing the clamp supporting rod 8 to an out of the way position, the sleeve 60 is turned in such manner so that it will raise on the threaded portion 56, until the sleeve 60 is above the tongue 57 and slot 58. Thereupon, the tongue 57 can be moved out of the slot 58 and the rod 8 can be pivoted upwardly. By reference to FIG. 10, it can be seen that there is a slight amount of clearance between the interior annular surface of the locking sleeve 60 and the exterior surface of the rod 8. When it is desired to lock the rod 8 to the rod 8', the locking sleeve 60 is turned on the threaded portion 56 until it is disposed over the slot 58 and tongue 57, and abuts the nylon washer 61. It is, of course, possible to provide some type of clamping arrangement (not shown) for securing the clamp supporting rod 8 to the support rod 8'. It is also possible to provide a removable pin similar to the pin 59 which can be withdrawn from the tongue 57 and slot 58 so that the clamp supporting rod 8 can be entirely removed from the support rod 8' when desired.

In use, the meat hook holder B is mounted alongside of a rail, such as the rail 7, containing a plurality of traveling meat hooks A. The meat hook holder B is mounted to the ceiling of the warehouse, dock, or similar support such as the support structure 9 by means of bolts or similar fasteners *b* in the manner shown in FIG. 1. When it is desired to hook a slab of meat onto the shank 1, the shank 1 is moved along the rail 7 until it is positioned in alignment with the vertical supporting rod 8. The leg of the shank 1 is moved along until it engagegs the recess 37 of the arm 31. Similarly, the enlarged eyelet *e* engages the recess 16 of the lower arm 11. Thereupon, the handle 42 is swung in the clockwise direction about the supporting rod 8 carrying therewith the actuating rod 40. The movement of the actuating rod 40 will close the clamps 10, 23, by the swinging of the upper arms 17, 31, respectively, to the "closed" position, that is the position as shown in the solid lines of FIGS. 2 and 6. It is to be noted that the upper arms 17, 31, will be held in the "closed" position against unauthorized movement by means of the detent elements 46, 50, engaging the recesses 47, 51, respectively.

Thereupon, a slab of meat is attached to the shank 1 and the handle 42 is swung in the counterclockwise direction opening each of the clamps 10, 23. The leg of the shank 1 is then removed from each of the clamps 10, 23, and moved along the support rail 7. In similar manner, a second shank 1 is moved into position for clamping in each of the clamps 10, 23, and, in like manner, a similar slab of meat is attached thereon.

It is, of course, understood that the clamps 52, 53, can be utilized in like manner if the shank 1 being used has an extended leg portion. Similarly, if the clamps 52, 53, 10, and 23 are not being used, the locking sleeve 60 is moved upwardly along the support rod 8' and the clamp supporting rod 8 is pivoted on the pin 59 into its upper position.

It should be understood that changes and modifications in the form, construction, arrangement, and combination of the several parts of the meat hook holders may be made and substituted for those herein shown and described without departing from the nature and principle of my invention.

Having thus described my invention, what I claim and desire to secure by letters patent is:

1. A meat hook holder for retaining traveling meat hooks and the like, said meat hook holder comprising support means, first clamping means having a movable arm and a rigid arm and being operatively mounted on said support means for preventing said meat hook from rotating about its central axis, said rigid and movable arms of said first clamping means having relatively straight opposed hook-engaging fingers, second clamping means having a movable arm and a rigid arm and being operatively mounted on said support means in downwardly spaced relation to said first clamping means for preventing shifting movement of said meat hook, the rigid and movable arms of said second clamping means having arcuately-shaped opposed hook-engaging fingers for retentively engaging the shank of said meat hook, and means operatively connected to the movable arms of said first and second clamping means for moving each of the movable arms of said first and second clamping means in unison.

2. A meat hook holder for retaining traveling meat hooks and the like, said meat hook holder comprising support means, at least one first clamping means having a movable arm and a rigid arm and being operatively mounted on said support means for preventing said meat hook from rotating about its central axis, said rigid and movable arms of said first clamping means having relatively straight opposed hook-engaging fingers, at least one second clamping means having a movable arm and a rigid arm and being operatively mounted on said support means in downwardly spaced relation to said first clamping means for preventing shifting movement of said meat hook, the rigid and movable arms of said second clamping means having arcuately-shaped opposed hook-engaging fingers for retentively engaging the shank of said meat hook, and means operatively connected to the movable arms of said first and second clamping means for moving each of the movable arms of said first and second clamping means in unison.

3. A meat hook holder for retaining traveling meat hooks and the like, said meat hook holder comprising support means, at least one first clamping means having a movable arm and a rigid arm and being operatively mounted on said support means for preventing said meat hook from rotating about its central axis, said rigid and movable arms of said first clamping means having relatively straight opposed hook-engaging fingers, at least one second clamping means having a movable arm and a rigid arm and being operatively mounted on said support means in downwardly spaced relation to said first clamping means for preventing shifting movement of said meat hook, the rigid and movable arms of said second clamping means having arcuately-shaped opposed hook-engaging fingers for retentively engaging the shank of said meat hook, means operatively connected to the movable arms of said first and second clamping means for moving each of the movable arms of said first and second clamping means in unison, and detent means operatively mounted in the movable arms and the set collars of each of said first and second clamping means for preventing the accidental opening of said first and second clamping means.

4. A meat hook holder for retaining traveling meat hooks and the like, said meat hook holder comprising a vertical support rod, at least one first clamping means having a movable arm and a rigid arm and being operatively mounted on said vertical support rod for preventing said meat hook from rotating about its central axis, said rigid and movable arms of said first clamping means having relatively straight opposed hook-engaging fingers, at least one second clamping means having a movable arm and a rigid arm and being operatively mounted on said vertical support rod in downwardly spaced relation to said first clamping means for preventing shifting movement of said meat hook, the rigid and movable arms of said second clamping means having arcuately-shaped opposed hook-engaging fingers for retentively engaging the shank of said meat hook, means operatively connected to the movable arms of said first and second clamping means for moving each of the movable arms of said first and second clamping means in unison, and detent means operatively mounted in the movable arms and the set collars of each of said first and second clamping means for preventing the accidental opening of said first and second clamping means.

5. A meat hook holder for retaining traveling meat hooks and the like, said meat hook holder comprising a vertical support rod having an upper port, a lower portion pivotally mounted on said upper portion, at least one first clamping means having a movable arm and a rigid arm and being operatively mounted on said vertical support rod for preventing said meat hook from rotating about its central axis, said movable and rigid arms of said first clamping means having relatively straight opposed hook-engaging fingers, at least one second clamping means having a movable arm and a rigid arm and being operatively mounted on said vertical support rod in downwardly spaced relation to said first clamping means for preventing shifting movement of said meat hook, the rigid and movable arms of said second clamping means having arcuately-shaped opposed hook-engaging fingers for retentively engaging the shank of said meat hook, means operatively connected to the movable arms of said first and second clamping means for moving each of the movable arms of said first and second clamping means in unison, and detent means operatively mounted in the movable arms and the set collars of each of said first and second clamping means for preventing the accidental opening of said first and second clamping means.

6. A meat hook holder for retaining traveling meat hooks and the like, said meat hook holder comprising a vertical support rod having an upper portion, a lower portion pivotally mounted on said upper portion, locking means for maintaining said upper and lower portions in a rigid position, at least one first clamping means having a movable arm and a rigid arm and being operatively mounted on said vertical support rod for preventing said meat hook from rotating about its central axis, said rigid and movable arms of said first clamping means having relatively straight opposed hook-engaging fingers, at least one second clamping means having a movable arm and a rigid arm and being operatively mounted on said vertical support rod in downwardly spaced relation to said first clamping means for preventing shifting movement of said meat hook, the rigid and movable arms of said second clamping means having arcuately-shaped opposed hook-engaging fingers for retentively engaging the shank of said meat hook, means operatively connected to the movable arms of said first and second clamping means for moving each of the movable arms of said first and second clamping means in unison, and detent means operatively mounted in the movable arms and the set collars of each of said first and second clamping means for preventing the accidental opening of said first and second clamping means.

7. A meat hook holder for traveling meat hooks according to claim 9, in which the support means includes a first support rod adapted to be mounted in a selected stationary position adjacent to the path along which the meat hooks travel, a second coaxially extending support rod pivotally secured to said first support rod, and locking means operatively disposed between said rods for optionally maintaining said first and second support rods in rigid coaxial position.

8. A meat hook holder for traveling meat hooks according to claim 7, in which said first support rod has a threaded portion at the end pivotally secured to said second support rod and in which the locking means includes a sleeve disposed about said threaded portion and being disposed over portions of said first and second rods when in the locked position, and abutment means on said second rod and being adapted to engage said sleeve, whereby said first and second rods can be held in rigid coaxial position.

9. A meat hook holder for retentively gripping, stabilizing and positioning traveling meat hooks which hang longitudinally downwardly from a supporting structure; said meat hook holder comprising a support element adapted for disposition in stationary position at a selected location in which the meat hook is to be held, first clamping means including a pair of arms mounted on said support element for relative movement toward and away from each other respectively into an open position and a closed position, said arms, in the open position, being adapted to receive a portion of a meat hook and, in the closed position, being adapted to engage said portion of the meat hook, said arms being provided with means for engaging and preventing said meat hook from rotating about its longitudinal axis, second clamping means also including a pair of arms mounted on said support element for relative movement toward and away from each other respectively into an open position and a closed position, said last-named arms, in the open position, being adapted to receive another portion of the meat hook and, in the closed position, being adapted to engage said other portion of the meat hook whereby to prevent said meat hook from swinging to-and-fro, and means operatively connected to one of the arms in each pair for moving the pairs of arms in said first and second clamping means into and out of closed position in unison.

10. A meat hook holder for retentively gripping, stabilizing and positioning traveling meat hooks which hang longitudinally downwardly from a supporting structure; said meat hook holder comprising a support element adapted for disposition in stationary position at a selected location in which the meat hook is to be held, first clamping means including a pair of arms mounted on said support element for relative movement toward and away from each other respectively into an open position and a closed position, said arms, in the open position, being adapted to receive a portion of a meat hook and, in the closed position, being adapted to engage said portion of the meat hook, said arms being provided with means for engaging and preventing said meat hook from rotating about its longitudinal axis, second clamping means also including a pair of arms mounted on said support element for relative movement toward and away from each other respectively into an open position and a closed position, said last-named arms, in the open position, being adapted to receive another portion of the meat hook and, in the closed position, being adapted to engage said other portion of the meat hook whereby to prevent said meat hook from swinging to-and-fro, means operatively connected to one of the arms in each pair for moving the pairs of arms in said first and second clamping means into and out of closed position in unison, and detent means operatively mounted in one arm of each pair of arms of each of said first and second clamping means for preventing the unauthorized opening of said first and second clamping means.

11. A meat hook holder for retentively gripping, stabilizing and positioning traveling meat hooks which hang longitudinally downwardly from a supporting structure; said meat hook holder comprising an elongated rigid support rod adapted for disposition in stationary position at a selected location in which the meat hook is to be held, first clamping means including a pair of arms mounted on said rigid support rod for relative movement toward and away from each other respectively into an open position and a closed position, said arms, in the open position, being adapted to receive a portion of a meat hook and, in the closed position, being adapted to engage said portion of the meat hook, said arms being provided with means for engaging and preventing said meat hook from rotating about its longitudinal axis, second clamping means also including a pair of arms mounted on said rigid support rod for relative movement toward and away from each other respectively into an open position and a closed position, said last-named means, in the open position, being adapted to receive another portion of the meat hook and, in the closed position, being adapted to engage said other portion of the meat hook whereby to prevent said meat hook from swinging to-and-fro, and spring-actuated detent means operatively associated with each pair of arms for optionally holding said pairs of arms in open and closed positions.

12. A meat hook holder for traveling meat hooks according to claim 11, in which the support means includes a first support rod adapted to be mounted in a selected stationary position adjacent to the path along which the meat hooks travel, a second coaxially extending support rod pivotally secured to said first support rod, and locking means operatively disposed between said rods for optionally maintaining said first and second support rods in rigid coaxial position.

13. A meat hook holder for traveling meat hooks according to claim 12, in which said first support rod has a threaded portion at the end pivotally secured to said second support rod and in which the locking means includes a sleeve disposed about said threaded portion and being disposed over portions of said first and second rods when in the locked position, and abutment means on said second rod and being adapted to engage said sleeve, whereby said first and second rods can be held in rigid coaxial position.

14. A meat hook holder for traveling meat hooks according to claim 11, in which the rigid support member is swingably suspended from another support member which is mounted in a selected stationary position adjacent to the path of movement along which the meat hooks travel and in which the two support members are provided with locking means for optionally holding the two support members rigidly together so that the first-named support member is located in vertically depending position below the second-named support member.

References Cited in the file of this patent

UNITED STATES PATENTS

| | | |
|---|---|---|
| 1,013,036 | McDonald et al. | Dec. 26, 1911 |
| 1,613,078 | Brenkert et al. | Jan. 4, 1927 |
| 1,778,332 | Mayer | Oct. 14, 1930 |
| 1,975,244 | Wiseman | Oct. 2, 1934 |
| 2,289,818 | Winner et al. | July 14, 1942 |
| 2,301,077 | Payton et al. | Nov. 3, 1942 |
| 2,332,328 | Luker | Oct. 19, 1943 |
| 2,536,441 | Guftason | Jan. 2, 1951 |
| 2,566,962 | Ramsey | Sept. 4, 1951 |
| 2,723,816 | Drysdale | Nov. 15, 1955 |
| 2,724,342 | Anderson et al. | Nov. 22, 1955 |